United States Patent Office.

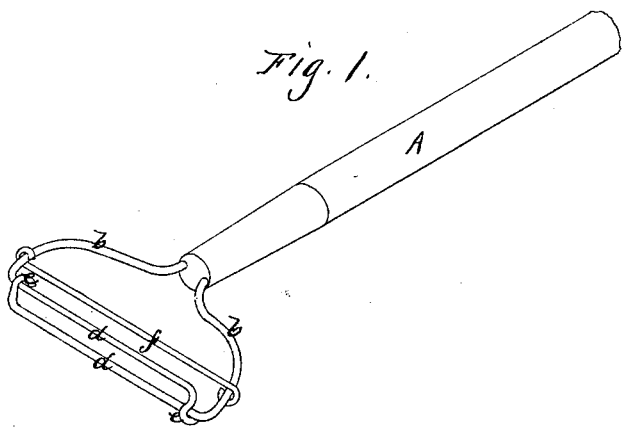
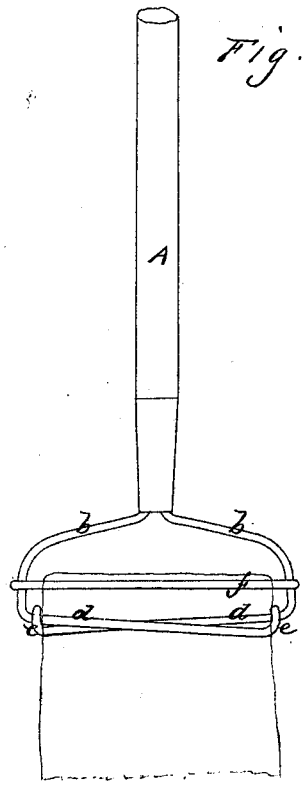

JOHN BRIZEE, OF ALVARADO, CALIFORNIA.

Letters Patent No. 112,014, dated February 21, 1871.

IMPROVEMENT IN MOP-HOLDERS.

The Schedule referred to in these Letters Patent and making part of the same.

*To all whom it may concern:*

Be it known that I, JOHN BRIZEE, of Alvarado, county of Alameda, State of California, have invented an Improved Mop-Holder; and I do hereby declare the following description and accompanying drawing are sufficient to enable any person skilled in the art or science to which it most nearly appertains to make and use my said invention or improvements without further invention or experiment.

My invention relates to an improved mop-holder, which is simple and cheap; and

It consists in employing strong wires or rods, which are secured to the mop-handle, and are bent so as to lock upon or over one another and bind the mop-cloth between them.

Another wire is arranged to slide upon the side wires parallel with and in a line with the space between the clamping-wires or rods around which the bight of the cloth is placed before it is clamped between the two parallel locking-wires.

In order to more fully illustrate and explain my invention reference is had to the accompanying drawing forming a part of this specification, in which—

A represents a mop-handle.

The mop-holder consists of two strong wires or rods $b$, one end of each of which is firmly secured in the end of the handle.

These rods or wires are then bent outward from each other and curved so as to form a semi-oval figure, as shown.

The outer ends or halves $d$ of these wires are then bent across the opening between the ends of the wires $b$, so that they will be parallel to each other, and their extremities are bent so as to form hooks or clasps $e$, which, when the mop-cloth has been placed between the wires $b$, are hooked over the opposite wire so as to bind the cloth between them.

A wire, $f$, has its opposite ends formed into loops, which encircle the side wires $b$, or is otherwise loosely secured to these wires, so that it can slide up or down upon them parallel to and in a line with the space between the wires $d$.

The mop-cloth is first placed over the sliding wire $f$, so that it shall hold the bight of the cloth. The parallel bar $d$ then being unhooked the ends of the cloth are placed between them, and the bars $d$ hooked over one another so as to bind the cloth between them and firmly hold it in place.

This mop-holder can be made very cheaply, yet will be strong and durable, and will be found especially convenient in using on account of the simple and ready manner in which the mop-cloth can be secured in place, and removed as desired.

Having thus described my invention,

What I claim, and desire to secure by Letters Patent, is—

The mop-holder, consisting of the side wires $b\ b$, parallel locking-wires $d\ d$, and sliding wire $f$, substantially as and for the purpose above described.

In witness whereof, I have hereunto set my hand and seal.

JOHN BRIZEE. [L. S.]

Witnesses:
JNO. L. BOONE,
WM. H. RUNNELS.